US011272316B2

(12) United States Patent
Scott et al.

(10) Patent No.: US 11,272,316 B2
(45) Date of Patent: Mar. 8, 2022

(54) LABORATORY UTILIZATION MONITORING AND ANALYTICS

(71) Applicant: Johnson Controls Tyco IP Holdings LLP, Milwaukee, WI (US)

(72) Inventors: Matthew Breed Myung-Sun Scott, Cork (IE); Joseph McEvoy, Cork (IE); Edward Gerard McNamara, Old Pallas (IE); Kyle Shamrock, Glenview, IL (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/169,745

(22) Filed: Feb. 8, 2021

(65) Prior Publication Data

US 2021/0243550 A1     Aug. 5, 2021

Related U.S. Application Data

(63) Continuation of application No. 16/526,768, filed on Jul. 30, 2019, now Pat. No. 10,917,740.

(51) Int. Cl.
*H04M 1/00* (2006.01)
*H04W 4/021* (2018.01)
(Continued)

(52) U.S. Cl.
CPC ........ *H04W 4/021* (2013.01); *G06Q 10/0631* (2013.01); *H04W 4/023* (2013.01); *H04W 4/029* (2018.02); *H04W 4/80* (2018.02)

(58) Field of Classification Search
CPC ....... H04W 4/021; H04W 4/029; H04W 4/80; H04W 4/023; G06Q 10/0631; G06Q 10/06312; G06Q 10/06135; G06Q 10/20
See application file for complete search history.

(56) References Cited

U.S. PATENT DOCUMENTS 6,148,306 A  11/2000 Seidl et al.
6,792,319 B1  9/2004 Bilger
(Continued)

FOREIGN PATENT DOCUMENTS

CN  207233190 U  4/2018
EP  1 770 454 A1  4/2007
(Continued)

OTHER PUBLICATIONS

Anonymous: "Delta Building Management and Controls System". Internet Article. Retrieved from the Internet: URL:http://www.deltaww.com/filecenter/solutions/download/05/Delta BMCS LDALISolution Guide 201608 eng.pdf?CID=23, Sep. 1, 2016, 17 pages.
(Continued)

*Primary Examiner* — Tuan Pham
(74) *Attorney, Agent, or Firm* — Foley & Lardner LLP (57) ABSTRACT

A method includes defining a plurality of monitored spaces. For each of at least a subset of the plurality of monitored spaces, the method includes associating a set of laboratory equipment with the monitored space, calculating an equipment utilization score for the monitored space based on resource consumption data for the set of laboratory equipment, calculating an occupancy utilization score for the monitored space based on occupant tracking data for the monitored space, and calculating a combined utilization score based on the equipment utilization score and the occupancy utilization score. The method also includes providing a graphical user interface comprising the combined utilization scores for the subset of the plurality of monitored spaces.

20 Claims, 7 Drawing Sheets

(51) Int. Cl.
*H04W 4/029* (2018.01)
*H04W 4/80* (2018.01)
*G06Q 10/06* (2012.01)
*H04W 4/02* (2018.01)

(56) References Cited

U.S. PATENT DOCUMENTS

| | | |
|---|---|---|
| 6,909,921 B1 | 6/2005 | Bilger |
| 9,459,607 B2 | 10/2016 | Frazer et al. |
| 9,475,359 B2 | 10/2016 | MacKay |
| 9,521,009 B1 | 12/2016 | Skeffington |
| 9,618,527 B2* | 4/2017 | McGown ............... G16H 20/30 |
| 9,733,656 B2 | 8/2017 | Janoso et al. |
| 10,156,833 B2 | 12/2018 | Ray et al. |
| 10,234,836 B2 | 3/2019 | Duchene et al. |
| 2004/0267385 A1 | 12/2004 | Lingemann |
| 2007/0219645 A1 | 9/2007 | Thomas et al. |
| 2008/0277486 A1 | 11/2008 | Seem et al. |
| 2008/0281472 A1 | 11/2008 | Podgorny et al. |
| 2009/0300174 A1 | 12/2009 | Floris et al. |
| 2010/0262298 A1 | 10/2010 | Johnson et al. |
| 2010/0280636 A1 | 11/2010 | Holland et al. |
| 2010/0307731 A1 | 12/2010 | Yonezawa et al. |
| 2010/0324962 A1 | 12/2010 | Nesler et al. |
| 2011/0047418 A1 | 2/2011 | Drees et al. |
| 2011/0087650 A1 | 4/2011 | MacKay et al. |
| 2011/0093126 A1 | 4/2011 | Toba et al. |
| 2011/0178977 A1 | 7/2011 | Drees |
| 2012/0001487 A1 | 1/2012 | Pessina |
| 2012/0029661 A1 | 2/2012 | Jones et al. |
| 2012/0083937 A1 | 4/2012 | Kong et al. |
| 2013/0218349 A1 | 8/2013 | Coogan et al. |
| 2013/0257626 A1 | 10/2013 | Masli et al. |
| 2013/0268128 A1 | 10/2013 | Casilli et al. |
| 2013/0297259 A1 | 11/2013 | Tsao et al. |
| 2014/0023363 A1 | 1/2014 | Apte |
| 2014/0195664 A1 | 7/2014 | Rahnama |
| 2014/0277765 A1 | 9/2014 | Karimi et al. |
| 2014/0316582 A1 | 10/2014 | Berg-Sonne et al. |
| 2014/0379156 A1* | 12/2014 | Kamel ................... G06Q 10/06 700/291 |
| 2015/0005900 A1 | 1/2015 | Steele et al. |
| 2015/0032265 A1 | 1/2015 | Herring et al. |
| 2015/0066169 A1 | 3/2015 | Nakano et al. |
| 2015/0088570 A1 | 3/2015 | Yenni et al. |
| 2015/0140990 A1 | 5/2015 | Kim et al. |
| 2015/0159893 A1 | 6/2015 | Daubman et al. |
| 2015/0168926 A1 | 6/2015 | Wood |
| 2015/0293508 A1 | 10/2015 | Piaskowski et al. |
| 2015/0312696 A1 | 10/2015 | Ribbich et al. |
| 2015/0370927 A1 | 12/2015 | Flaherty et al. |
| 2016/0020918 A1 | 1/2016 | Lu |
| 2016/0095188 A1 | 3/2016 | Verberkt et al. |
| 2016/0147207 A1 | 5/2016 | Park et al. |
| 2016/0258641 A1 | 9/2016 | Cheatham et al. |
| 2016/0282825 A1 | 9/2016 | Kariguddaiah |
| 2016/0320760 A1 | 11/2016 | Brun et al. |
| 2017/0026194 A1 | 1/2017 | Vijayrao et al. |
| 2017/0124842 A1 | 5/2017 | Sinha et al. |
| 2017/0191695 A1 | 7/2017 | Bruhn et al. |
| 2017/0195130 A1 | 7/2017 | Landow et al. |
| 2017/0234067 A1 | 8/2017 | Fasi et al. |
| 2017/0281819 A1 | 10/2017 | Jones et al. |
| 2017/0350615 A1 | 12/2017 | Ashar |
| 2017/0366414 A1 | 12/2017 | Hamilton et al. |
| 2018/0005195 A1 | 1/2018 | Jacobson |
| 2018/0101146 A1 | 4/2018 | Hariharan et al. |
| 2018/0113897 A1 | 4/2018 | Donlan et al. |
| 2018/0120778 A1 | 5/2018 | Billings |
| 2018/0120788 A1 | 5/2018 | Billings |
| 2018/0191197 A1 | 7/2018 | Carr et al. |
| 2018/0210438 A1 | 7/2018 | Ashar et al. |
| 2018/0270063 A1 | 9/2018 | Bard et al. |
| 2018/0276775 A1 | 9/2018 | Khurana et al. |
| 2018/0299845 A1 | 10/2018 | Ray et al. |
| 2018/0314277 A1 | 11/2018 | Moore et al. |
| 2019/0011894 A1 | 1/2019 | Meyer et al. |
| 2019/0033802 A1 | 1/2019 | Chatterjee et al. |
| 2019/0203532 A1 | 7/2019 | Feldstein |
| 2019/0250575 A1 | 8/2019 | Jonsson |
| 2020/0065444 A1* | 2/2020 | Bullock ............... G06F 30/367 |

FOREIGN PATENT DOCUMENTS

| | | |
|---|---|---|
| WO | WO-2010/141601 A2 | 12/2010 |
| WO | WO-2016/180754 A1 | 11/2016 |

OTHER PUBLICATIONS

International Search Report & Written Opinion for PCT/US2020/043856 dated Oct. 6, 2020, 15 pages.
International Search Report and Written Opinion on PCT/US2018/027396, dated Jun. 27, 2018. 16 pages.
International Search Report and Written Opinion on PCT/US2018/051182, dated Nov. 22, 2018, 17 pages.
Rowland, "Designing Connected products: UX for the Consumer Internet of Things," May 31, 2015, pp. 2, 5-6, 8-14, 32-35, 48-49, 52, 93, 95-99, 123, 307, 312, 395, 532, 613-625.
Sinopoli, "Smart Buildings Systems for Architects, Owners and Builders," Nov. 18, 2009, chapters 3, 4, 5 and 6, pp. 3-8, 129-136.
Wikipedia: "Building automation," URL:https://en.wikipedia.org/w/index.php?title=Buildingautomation&oldid=799424260, Sep. 7, 2017. 12 pages.
Wikipedia: "Building management system," URL:https://en.wikipedia.org/w/index.php?title=Buildingmanagementsystem&oldid=797980461, Aug. 30, 2017, 4 pages.

* cited by examiner

| BLOCKS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| START | 900 | 905 | 910 | 915 | 920 | 925 | 930 | 935 | 940 | 945 | 950 | 955 | 1000 | 1005 | 1010 | 1015 | 1020 | 1025 | 1030 | 1035 | 1040 | 1045 | 1050 |
| END | 905 | 910 | 915 | 920 | 925 | 930 | 935 | 940 | 945 | 950 | 955 | 1000 | 1005 | 1010 | 1015 | 1020 | 1025 | 1030 | 1035 | 1040 | 1045 | 1050 | 1055 |
| EG1 | | | | | | | | | | | | | | | | | | | | | | | |
| EG2 | | | | | | | | | | | | | | | | | | | | | | | |
| EG3 | | | | | | | | | | | | | | | | | | | | | | | |

| BLOCKS | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |
|---|---|---|---|---|---|---|---|---|---|---|---|---|---|---|---|---|---|---|---|---|---|---|---|
| START | 1140 | 1145 | 1150 | 1155 | 1200 | 1205 | 1210 | 1215 | 1220 | 1225 | 1230 | 1235 | 1240 | 1245 | 1250 | 1255 | 1300 | 1305 | 1310 | 1315 | 1320 | 1325 | 1330 |
| END | 1145 | 1150 | 1155 | 1200 | 1205 | 1210 | 1215 | 1220 | 1225 | 1230 | 1235 | 1240 | 1245 | 1250 | 1255 | 1300 | 1305 | 1310 | 1315 | 1320 | 1325 | 1330 | 1335 |
| EG1 | | | | | | | | | | | | | | | | | | | | | | | |
| EG2 | | | | | | | | | | | | | | | | | | | | | | | |
| EG3 | | | | | | | | | | | | | | | | | | | | | | | |

| BLOCKS | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 |
|---|---|---|---|---|---|---|---|---|---|---|---|---|---|---|---|---|---|---|---|---|---|---|---|
| START | 1420 | 1425 | 1430 | 1435 | 1440 | 1445 | 1450 | 1455 | 1500 | 1505 | 1510 | 1515 | 1520 | 1525 | 1530 | 1535 | 1540 | 1545 | 1550 | 1555 | 1600 | 1605 | 1610 |
| END | 1425 | 1430 | 1435 | 1440 | 1445 | 1450 | 1455 | 1500 | 1505 | 1510 | 1515 | 1520 | 1525 | 1530 | 1535 | 1540 | 1545 | 1550 | 1555 | 1600 | 1605 | 1610 | 1615 |
| EG1 | | | | | | | | | | | | | | | | | | | | | | | |
| EG2 | | | | | | | | | | | | | | | | | | | | | | | |
| EG3 | | | | | | | | | | | | | | | | | | | | | | | |

LABORATORY UTILIZATION MONITORING AND ANALYTICS

CROSS-REFERENCE TO RELATED PATENT APPLICATION

This application is a continuation of U.S. patent application Ser. No. 16/526,768 filed Jul. 30, 2019, the entirety of which is incorporated by reference herein.

BACKGROUND

Large, sophisticated laboratories (e.g., research and development facilities, pharmaceutical company facilities, etc.) typically use many high value and sensitive equipment assets in addition to various specialized laboratory workspaces. Managers of such facilities may be responsible for understanding and planning space layout design, equipment management, workflow managing, resource usage, etc. for the space. For example, managers of such facilities may be tasked with designing laboratories, placing equipment, organizing work schedules, etc. to maximize the productivity of the laboratories and the personnel that work there. Furthermore, as research priorities shift, new equipment is acquired, or other changes occur, modifications to such designs, plans, layouts, etc. may be desirable. Such adaptations are preferably supported by robust information relating to a laboratory, which may be difficult to acquire. Accordingly, a need exists for systems and methods for generating, collecting, and analyzing information relating to actual utilization of laboratories to guide management, redesign, and other planning for the laboratories.

SUMMARY

One implementation of the present disclosure is a method. The method includes defining a plurality of monitored spaces. For each of the plurality of monitored spaces, the method includes associating a set of laboratory equipment with the monitored space, calculating an equipment utilization score for the monitored space based on resource consumption data for the set of laboratory equipment, calculating an occupancy utilization score for the monitored space based on occupant tracking data for the monitored space, and calculating a combined utilization score based on the equipment utilization score and the occupancy utilization score. The method also includes providing a graphical user interface comprising the combined utilization scores for the plurality of monitored spaces.

In some embodiments, the method includes operating the set of laboratory equipment to consume electrical power via network-connected plugs and measuring, by the network-connected plugs, amounts of the electric power consumed by the set of laboratory equipment. The resource consumption data includes the amounts of the electrical power.

In some embodiments, the method includes tracking positions of a plurality of beacons. Each beacon is associated with an occupant of the plurality of monitored spaces. The method also includes defining the occupant tracking data based on a number of the plurality of beacons positioned at the monitored space. In some embodiments, the plurality of beacons include Bluetooth Low Energy (BLE) badges. Tracking positions of the plurality of beacons may include, for each beacon, detecting, by each of three or more transceivers, a distance between the transceiver and the beacon and performing a triangulation calculation based on the distances and the positions of the transceivers to determine a position of the beacon.

In some embodiments, defining the plurality of monitored spaces includes defining a geofence around each of the monitored spaces and defining the occupant tracking data for the monitored space includes determining whether the position of the beacon is within the geofence for the monitored space.

In some embodiments, calculating the combined utilization score includes normalizing the equipment utilization score based on an expected equipment utilization, normalizing the occupancy utilization score based on an expected occupancy, and at least one of adding the equipment utilization score to the occupancy utilization score or multiplying the equipment utilization score by the occupancy utilization score.

In some embodiments, calculating the equipment utilization score includes determining, for each of a plurality of sub-periods in a time period and for each device in the set of laboratory equipment, a status of the device based on the resource consumption data, counting, for each device, a number of the plurality of sub-periods for which the status of the device indicates utilization of the device to determine a device utilization score, and averaging the device utilization scores for the set of laboratory equipment to determine the equipment utilization score for the monitored space. Determining the status of the device based on the resource consumption data may include comparing an amount or rate of resource consumption for the device during the sub-period to a threshold value. The method may include determining the status of the device as in-use when the amount or rate of electrical power consumption for the device during the sub-period exceeds the threshold value.

In some embodiments, associating a set of laboratory equipment with the monitored space includes determining whether a tag associated with a first device of laboratory equipment is located within a perimeter of the monitored space, and, in response to determining that the tag associated with the first device of laboratory equipment is located within the perimeter of the monitored space, associating the first device of laboratory equipment with the monitored space.

Another implementation of the present disclosure is a system. The system includes laboratory equipment positioned in a plurality of spaces of a laboratory facility and configured to consume electrical power when operating, a tracking system configured to detect locations of occupants of the laboratory facility, one or more processors, and one or more non-transitory computer-readable media storing program instructions executable by the one or more processors, the program instructions causing the one or more processors to perform operations. The operations include defining boundaries of the plurality of spaces of the laboratory facility, calculating, for at least one of the plurality of spaces, an equipment utilization score based on data representing resource consumption of the laboratory equipment positioned in the space over a time period, calculating, for the at least one of the plurality of spaces, an occupancy utilization score based on data representing a number of people occupying the space over the time period, and calculating, for the at least one of the plurality of spaces, a combined utilization score based on the equipment utilization score for the space and the occupancy utilization score for the space.

In some embodiments, the system includes a plurality of network-connected plugs. The laboratory equipment is configured to draw electrical power from a building electrical system via the network-connected plugs. The plurality of network-connected plugs are configured to measure electrical power consumption of the laboratory equipment to obtain the data representing resource consumption of the laboratory equipment and transmit the data representing resource consumption of the laboratory equipment to the one or more processors.

In some embodiments, the system includes a plurality of beacons. Each beacon is associated with an occupant of the laboratory facility. The operations include determining the number of people occupying the space over the time period based on tracked positions of the plurality of beacons. The beacons may include Bluetooth Low Energy (BLE) badges, and the system may include a plurality of transceivers. Each transceiver is configured to detect a distance between the transceiver and a subset of the BLE badges proximate the transceiver. The operations include determining a position of the occupant associated with the beacon by performing a triangulation calculation using the distances detected by the transceivers. In some embodiments, determining the number of people occupying the space comprises determining whether the position of the occupant is within the boundary of the space.

In some embodiments, calculating the combined utilization score includes normalizing the equipment utilization score based on an expected equipment utilization and normalizing the occupancy utilization score based on an expected occupancy.

In some embodiments, calculating the equipment utilization score includes determining, for each of a plurality of sub-periods in the time period and for each device in of laboratory equipment positioned at the space, a status of the device based on the data representing resource consumption, counting, for each device, a number of the plurality of sub-periods for which the status of the device indicates utilization of the device to determine a device utilization score, and averaging the device utilization scores for the devices of laboratory equipment positioned at the space to determine the equipment utilization score for the space. Determining the status for the device may include comparing an amount or rate of resource consumption for the device during the sub-period to a threshold value. Determining the status for the device may include identifying the status of the device as having an in-use status when the amount or rate of resource consumption for the device during the sub-period exceeds the threshold value.

In some embodiments, the system includes a plurality of trackable tags. Each trackable tag is associated with a device of the laboratory equipment. The operations include automatically identifying the laboratory equipment positioned at the space based on tracked positions of the trackable tags.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
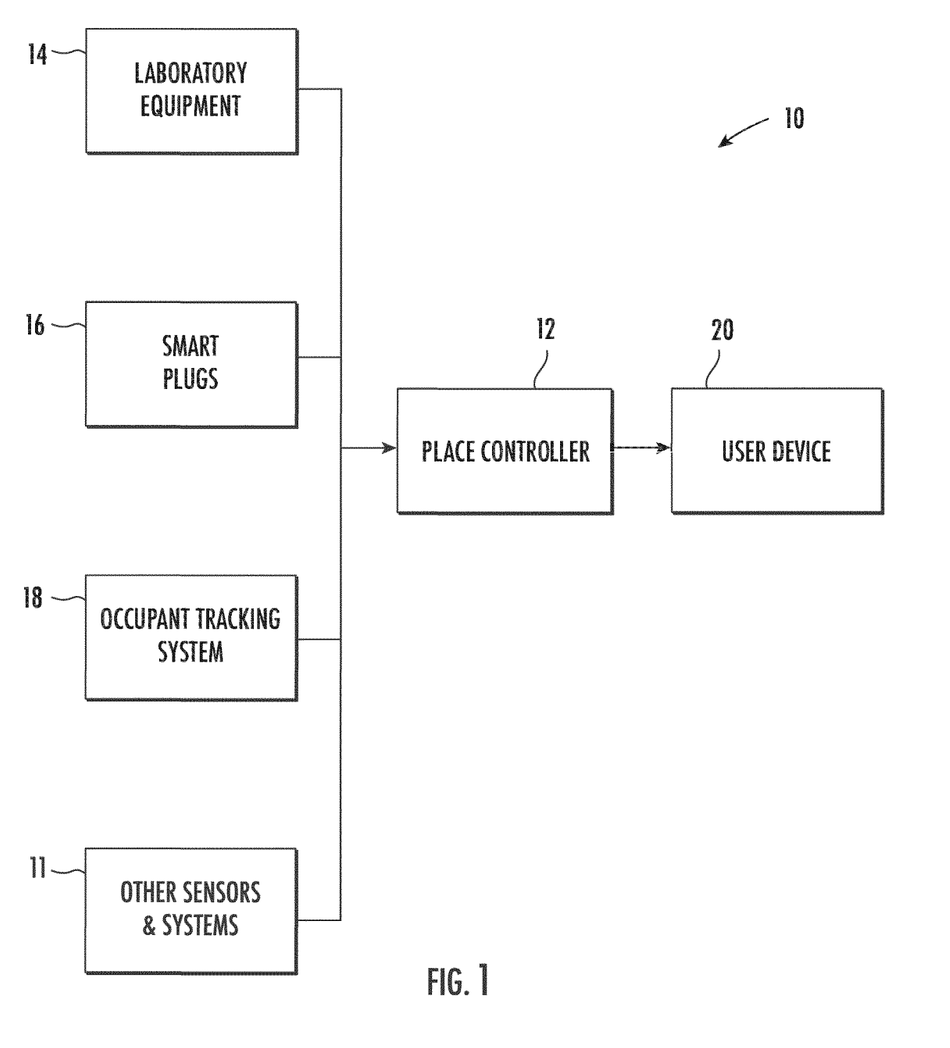
FIG. 1 is a block diagram of a system for monitoring utilization of a laboratory facility, according to an exemplary embodiment.

Referring now to FIG. 1, a block diagram of a system 10 for monitoring utilization of a laboratory facility is shown, according to an exemplary embodiment. A research laboratory is a complex technology that includes various spaces and equipment that interoperate to execute experiments and generate experimental results. For research laboratories, some spaces may include high-value equipment that supports various research and experiments, and which may be fully operational (e.g., running automatically) without a person in the space actively monitoring the equipment. Such a space can be characterized as being well-utilized when such equipment is running in the space. Other spaces may include researcher work space (lab benches, etc.), which is understood as being well-utilized when occupied by multiple people. To provide a holistic view of space utilization which can be compared across various spaces of a research laboratory, both equipment utilization and occupant utilization of various spaces is considered by the system 100. As described in detail herein, the system 10 is configured to receive various types of data from various types of data sources, process the data to extract an equipment utilization score, an occupancy utilization score, and a combined utilization score for each of multiple spaces of a laboratory facility, and generate a graphical user interface that displays the metrics. The system 10 thereby provides technical improvements to the research laboratory by guiding space redesign, experiment scheduling, equipment acquisition, etc., leading to more efficient and effective operation of a research laboratory.

As shown in FIG. 1, the system 10 includes a place controller 12, laboratory equipment 14 communicable with the place controller 12, smart outlets 16 communicable with the place controller 12, and occupant tracking system 18 communicable with the place controller 12, and other sensors and systems 11 communicable with the place controller 12. The system 10 is also shown to include a user device 20 communicable with the place controller 102.

The laboratory equipment 14 may include various devices that support research activities in a laboratory, for example centrifuges, microscopes, x-ray diffraction units, mass spectrometers, chemical processing equipment, computing resources (supercomputers, servers, etc.), incubators, and imaging systems, among many other possibilities depending on the research goals and particular scientific focus (e.g., pharmaceutical, biotechnology, food science, physics, etc.) of the laboratory.

In some embodiments, the laboratory equipment 14 is configured to collect data relating to operation of the laboratory equipment 14. For example, a device of laboratory equipment 14 may be configured to store a log of when the device is turned on/off, how long the device is used for, what functions the device is commanded to perform, etc. In such a case, the laboratory equipment 14 obtains operating data that describes when the laboratory equipment 14 is in-use (operating, active, executing a experiment, etc.) or out-of-use (off, idle, etc.). The laboratory equipment 14 may be communicable with the place controller 12 (e.g., via information technology network (e.g., Ethernet, Wi-Fi, etc.) or a building network (e.g., BACNet, MSTP, etc.) to provide the operating data to the place controller 12.

The laboratory equipment 14 may consume one or more utility resources (e.g., electricity, natural gas, water, etc.) or specialty research resources (distilled water, specialty chemicals, radioactive materials, liquid nitrogen, atmospheric gases, etc.). In some embodiments, the laboratory equipment 14 is configured to measure the resource consumption of the laboratory equipment 14. The amount or rate of resource consumption may correspond to a status of the laboratory equipment 14. For example, a device of laboratory equipment 104 may consume a first amount of electricity when in an idle or off, a second amount of electricity during start-up of the device or during configuration of an experiment for the device, and a third amount of electricity while performing a primary function of the device (e.g., executing an experiment task, etc.). The different amounts may be known or experimentally-determinable, such that they can be used to determine the status of the laboratory equipment 14 as described in detail below. Various statuses are possible depending on the functionality of a given device. Although the examples herein are described primarily in terms of electrical power consumption, it should be understood that embodiments using measurements of any other type of resource consumed by laboratory equipment are also within the scope of the present disclosure.

The laboratory equipment 14 may draw electricity from a building electrical system via smart plugs 16. In the example shown, the smart plugs 16 are configured to be placed between a standard electrical outlet (e.g., wall outlet) and a power cord for a device of laboratory equipment 14. The smart plugs 16 can thereby be used with the system 10 without requiring any modification or specialization of the building electrical system. In other embodiments, the functions attributed herein to the smart plugs 16 may be performed by an element of the building electrical system (e.g., smart wall outlets, etc.).

Each smart plug 16 is configured to measure the amount or rate of electrical power passing therethrough to obtain a time series of electrical power measurements ("power consumption data") and to transmit the power consumption data to the place controller 12. The power consumption data may include both an amount or rate of electrical power consumption and a time stamp associated with that amount or rate. The smart plugs 16 may be communicable with the place controller 12 via a wireless network, for example a WiFi network or cellular network.

The occupant tracking system 18 is configured to track occupants (people) in the laboratory. Various types of occupant tracking systems 18 are included in various embodiments. For example, in some embodiments the occupant tracking system 18 is implemented as part of an access and security system, in which a user can enter or exit a space by presenting a badge to an electronic card reader (e.g., RFID, magnetic stripe, etc.). The occupant tracking system 18 may monitor occupant locations based on entry into various secure spaces.

In other embodiments, the occupant tracking system 18 includes multiple beacons, with each beacon associated with an occupant, and a set of transceivers configured to determine the locations of the beacons. The beacons may be formed as Bluetooth Low Energy (BLE) badges, which may be worn or carried by personnel in the laboratory. The transceivers may be arranged around the laboratory. Each transceiver is configured to detect the presence of the beacons and determine a distance from a beacon to the transceiver. Based on the distance of a beacon to three or more transceivers, the location of the beacon can be determined with a high degree of accuracy. Such a system allows for occupant tracking across spaces regardless of whether the spaces are separated by walls or doors and to precisely locate occupants within a space.

The system 10 is also shown as including other sensors and systems 11. The other sensors and system 11 may provide various data relating to occupancy of the space in various ways. For example, a calendaring or scheduling system may be included that provides information about meeting times, holidays, experiment schedules, which may be relevant to analyzing space utilization. As another example, other sensors that measure usage or inventory may be included, for example a smart toilet sensor that measures a number of flushes and provides such information to the place controller 12. The present disclosure contemplates inclusion of any such available data in various embodiments.

The place controller 12 is configured to receive equipment operating data from the laboratory equipment 14 and/or the smart plugs 16, occupancy data from the occupant tracking system 18, and, in some embodiments, other utilization-related data from the other sensors and systems 10. The place controller 12 may associated the data points with one or more of multiple spaces of the laboratory. The place controller 12 is also configured to process the data to determine an equipment utilization score, an occupant utilization score, and a combined utilization score, as described in detail below with reference to FIG. 3. The place controller 12 is also configured to generate a graphical user interface illustrating space utilization scores for the laboratory and to cause the user device 20 (e.g., smartphone, laptop, desktop computer, etc.) to display the graphical user interface. These and other features are described in detail below.

Figure 2:
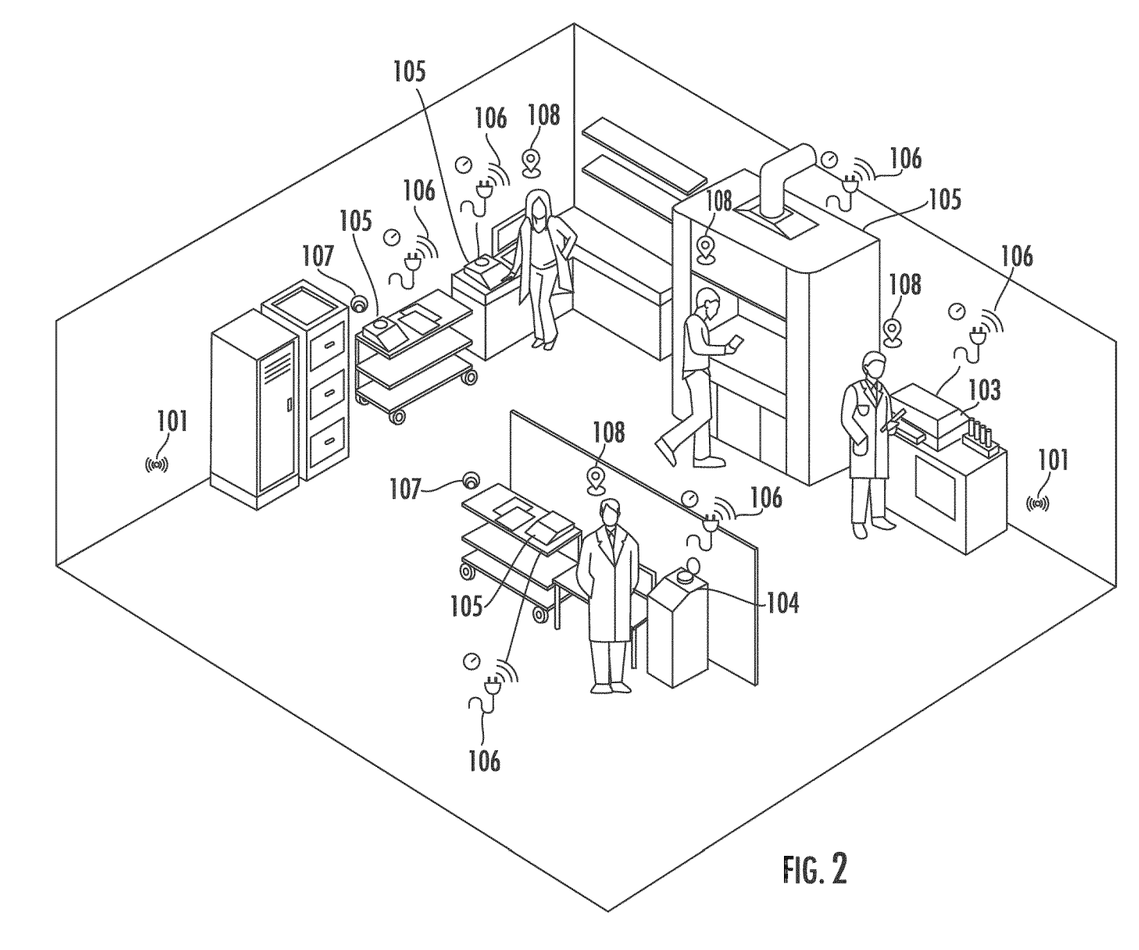
FIG. 2 is a perspective view of a monitored space of the laboratory facility served by the system of FIG. 1, according to an exemplary embodiment.

Referring now to FIG. 2, a perspective view of an example space in the laboratory served by the system 10. The space is geofenced using sensors 101 (e.g., Bluetooth transceivers) included with occupant tracking system 18. The sensors 101 are arranged to provide occupant detection around a perimeter of the space. FIG. 2 also shows various laboratory equipment 14, including a fume hood 102, water bath 103, centrifuge 104, and scales 105. These devices of laboratory equipment 14 are connected to smart plugs 106. In the embodiment shown, mobile laboratory equipment (e.g., scales 105 in FIG. 2) includes a location tag 107 (e.g., a Bluetooth beacon) which can be tracked by the sensors 101 of the occupant tracking system, for example to determine which space the mobile laboratory equipment is in at a given time. The occupants are shown to be carrying locations tags 108 (e.g., BLE badges) which can be triangulated using data from the sensors 101 of the occupant tracking system 18. The array of sensors, trackers, plugs, equipment, etc. provides an example of the hardware which may be included in a laboratory to facilitate the utilization monitoring described herein.

Figure 3:
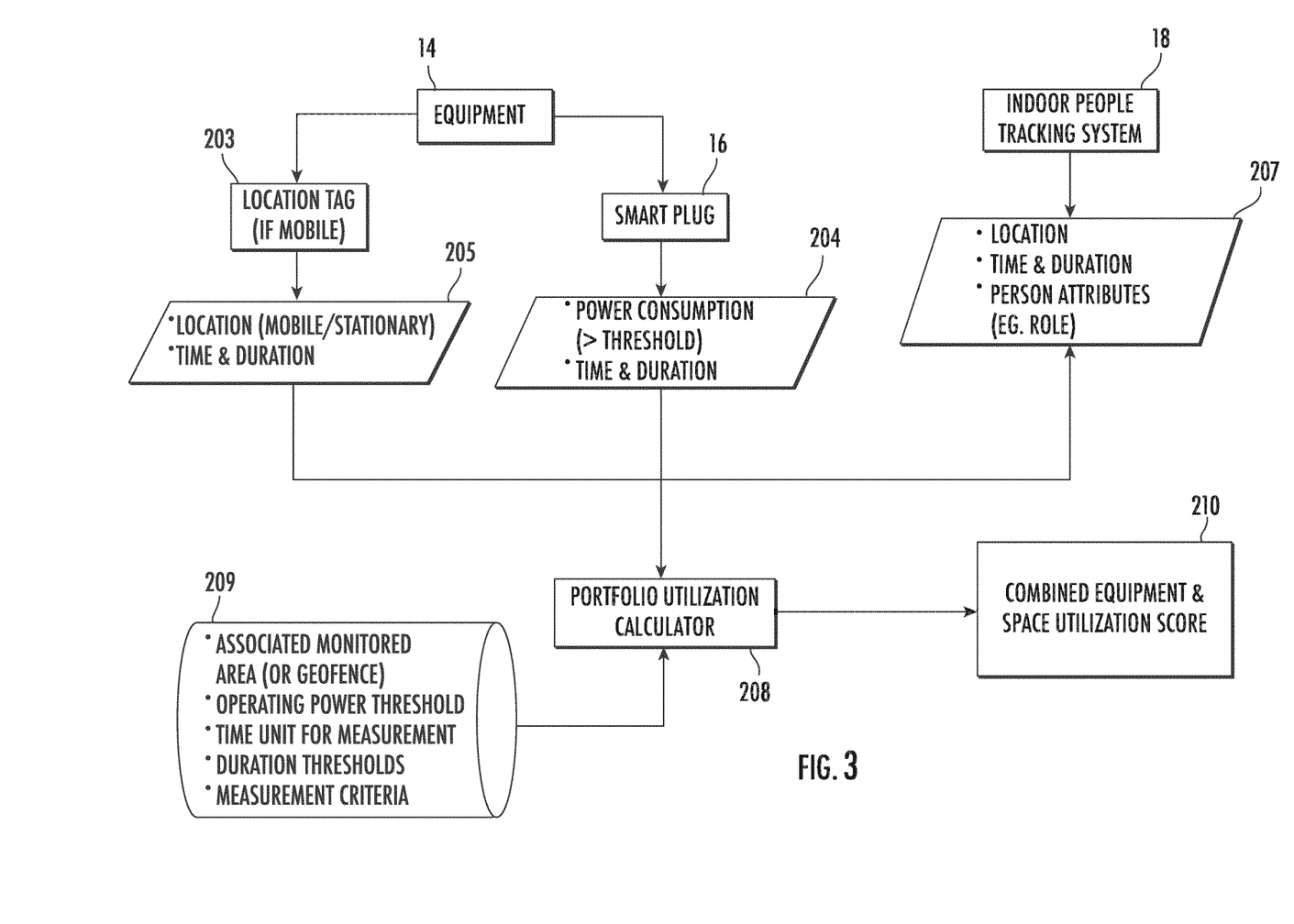
FIG. 3 is a schematic diagram for one example of the system of FIG. 1, according to an exemplary embodiment.

Referring now to FIG. 3, a schematic illustrating the elements of the system 10 and the data transfers and associations there is shown, according to an exemplary embodiment. As illustrated by FIG. 3, equipment 14 is connected to a smart plug 16, and, in the embodiment shown, to a location tag 203 (e.g., location tag 107). The location tag is used, as shown in block 205, to provide data relating to the location of the equipment 14 and a time and duration relating to such equipment 14. That is, the data at block 205 may include locations of the equipment associated with time stamps, such that the amount of time the equipment 14 spends in any particular space can be ascertained. The smart plug 16 is shown to provide power consumption data and time and duration relating to such power consumption (e.g., a time series of power consumption values) at block 204. In some embodiments, the smart plug 16 only reports the power consumption when the power consumption is above a threshold value. The smart plug 16 may be configured to provide an identification code or other information that associates a particular smart plug 16 (and the data provided thereby) with a particular unit of equipment 14.

FIG. 3 also shows that occupant tracking system 18 provides locations of occupants, the time and duration associated with such locations, and attributes of the occupants (e.g., role, job title, etc.) at block 207. The occupant tracking system 18 thereby provides the information needed to assess the number of people who used a space over a time period, and, in some period, the types of persons that utilized the space (e.g., researchers, janitors, interns, senior management, etc.).

As illustrated in FIG. 3, the data from block 205, block 204, and block 207 are provided to portfolio utilization calculator 208. The portfolio utilization calculator 208 may be executed by the place controller 12. As shown in FIG. 3, the portfolio utilization calculator 208 also receives various pre-stored parameters from a database 209 of the place controller 12. The database 209 is shown as specifying one or more geofenced spaces (e.g., defined based on a boundary of such a space), an operating power threshold (e.g., used to differentiate operating/idle states of equipment 14, a time unit for measurements, durations thresholds, and measurement criteria. For example, a time unit for measurements may specify that utilization is assessed based on increments of a specified duration (e.g., five minutes). The parameters in the database 209 can be configured/edited by a user to facilitate operation of the portfolio utilization calculator 208.

As shown in FIG. 3, the portfolio utilization calculator 208 is configured to output a combined equipment and space utilization score based on the information from block 205, block 204, block 207, and database 209. The portfolio utilization calculator 208 may calculate the combined space utilization score by calculating an equipment utilization score $U_{equipment}$ and separately calculating an occupant utilization score $U_{occupants}$, and then performing a mathematical function to get the combined utilization score, i.e., $U_{combined} = f(U_{equipment}, U_{occupants})$. For example, in some embodiments the utilization scores are normalized such that $0 < U_{equipment} \leq 1$ and $0 < U_{occupants} \leq 1$. The combined score can then be calculated to also have a normalized value between zero and one as $U_{combined} = U_{equipment} * U_{occupants}$ or $U_{combined} = \frac{1}{2} * (U_{equipment} + U_{occupants})$. In some embodiments, the values may exceed 1 to indicate over-use of a space.

In some embodiments, the combined utilization score is calculated as a weighted average, such that the equipment utilization score or the occupant utilization score is given more influence over the combined utilization score, e.g., $U_{combined} = \frac{1}{2} * (q * U_{equipment} + r * U_{occupants})$, where q, r are scalar parameters (e.g., q+r=2). The relative values of the weights may be selected based on a intended purpose of a space, for example such that the equipment score has a larger weight than the occupancy weight when the space is primarily intended to house automatically-operating equipment and vice versa when the space is primarily intended as human workspace. The relative values of the weights may also be automatically assigned as a function of the area (e.g., square footage) of a space and the number and/or type(s) of devices of equipment assigned to the space. In some cases, for a space that does not include any monitored equipment, the weight q may be set to zero, such that the resulting combined utilization score is equal to the occupancy utilization score, i.e., $U_{combined} = U_{occupants}$. As another example, a space may characterized as being filled by equipment without any area remaining for occupants (or such that, for some other reason, occupancy is considered irrelevant to utilization), in which case the weight r may be set to zero and the resulting combined utilization score is equal to the equipment utilization sore, i.e., $U_{combined} = U_{equipment}$. Accordingly, the weighting parameters q, r allow customization of the combined utilization score across spaces to accommodate differences between spaces while also providing a metric (i.e., the combined utilization score) that can be compared across different spaces having different sizes, purposes, equipment, etc.

The portfolio utilization calculator 208 (i.e., the place controller 12) may calculate the occupant utilization score $U_{occupants}$ may be calculated using a maximum or expected occupant capacity for the space and a minimum dwell threshold. For example, for each of a plurality of sub-periods of a time period (e.g., for each hour in a business day), the portfolio utilization calculator 208 may process the data from the occupant tracking system 18 to determine a number of people who occupied the space for longer than the minimum dwell threshold during that sub-period. The minimum dwell threshold prevents occupants from being counted for merely transient movement through the space. The portfolio utilization calculator 208 may then divide the number of people who occupied the space for longer than the minimum dwell threshold during that sub-period by the maximum or expected occupant capacity for the space to get an occupant utilization score for the sub-period, e.g., $$U_{occupants,i} = \frac{N_{detected,i}}{N_{expected,i}}$$

where the subscript i denotes a sub-period, $N_{detected,i}$ is the number of people who occupied the space for more than the minimum dwell threshold, and $N_{expected,i}$ is an expected or maximum occupancy. The occupant utilization score for the overall time period may then be calculated as an average of the sub-period scores, for example such that $$U_{occupants} = \frac{1}{h} * \sum_{i=1}^{h} U_{occupants,i},$$

where h is the number of sub-periods in the time period being assessed.

In such embodiments, the expected or maximum occupancy $N_{expected,i}$ can be defined separately for different spaces and, in some embodiments, may vary over the course of a day or other time period (hence the subscript i). For example, spaces primarily used as hands-on research workspaces may have relatively large values for $N_{expected}$, while spaces primarily intended to house large, automated equipment may have small values for $N_{expected}$. Accordingly, $N_{expected,i}$ can be tuned such that the occupancy utilization score $U_{occupants}$ is calculated based on an intended/expected purpose of the corresponding space. This may facilitate comparison across spaces having different purposes.

Figure 5:
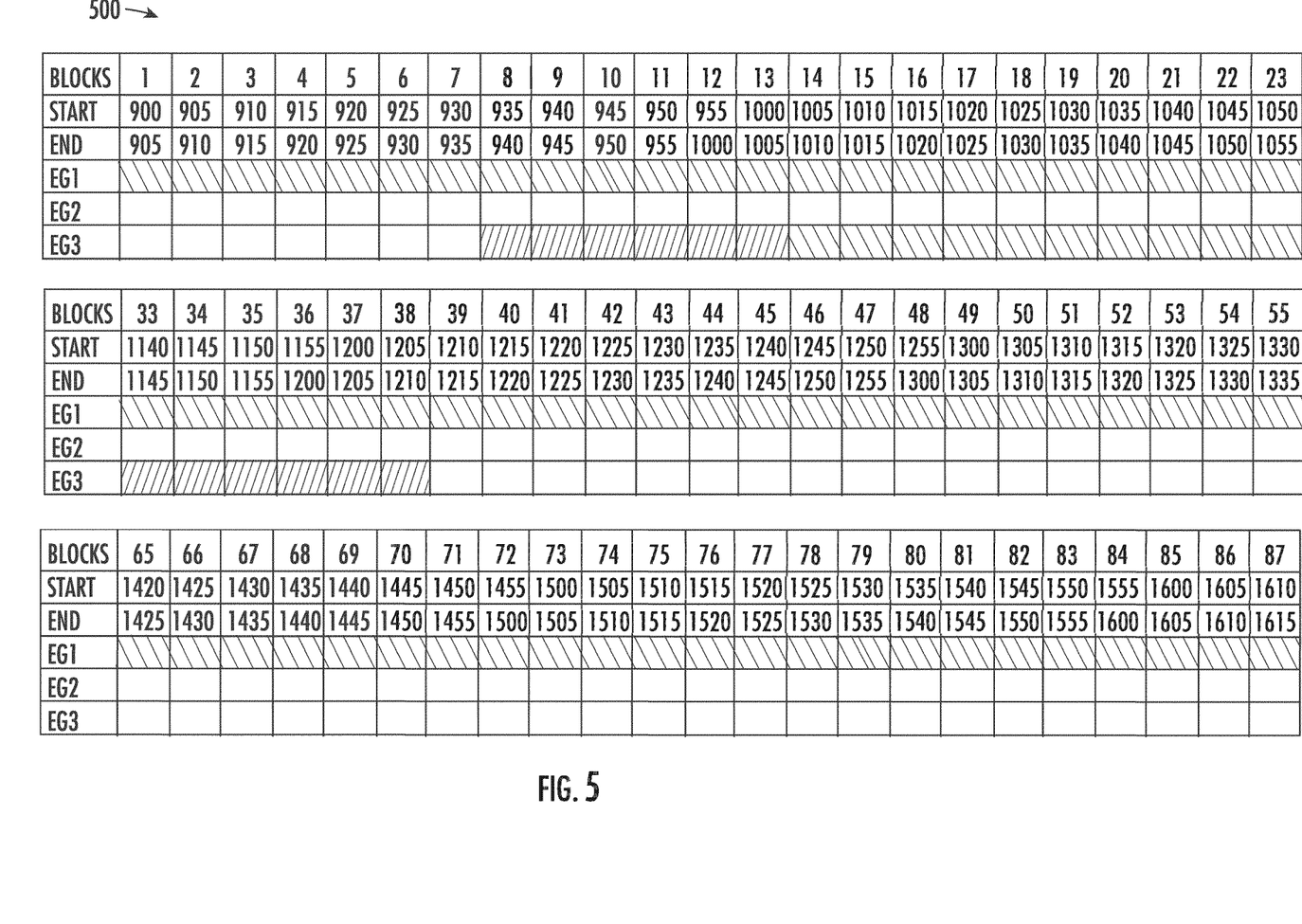
FIG. 5 is a depiction of visualization illustrating how equipment utilization may be assessed in the process of FIG. 4, according to an exemplary embodiment.

The portfolio utilization calculator 208 may calculate the equipment utilization score $U_{equipment}$ by determining, for each device of laboratory equipment 14 present at a space, a number of sub-periods (e.g., 5-minute blocks) of a time period (e.g., a business day) for which the equipment has an in-use status. For example, the portfolio utilization calculator 208 may count a device as in-use (operational, active, etc.) for a sub-period if the power consumption of the device is greater than a threshold value for that device over the sub-period, and out-of-use for the sub-period if the power consumption is less than the threshold value. The portfolio utilization calculator 208 can thereby label each sub-period as either in-use or out-of-use or, in some embodiments, one or more additional statuses (e.g., start-up, cool-down, maintenance, etc.). FIG. 5 shows an example table of coded time blocks for three devices of laboratory equipment 14, described in detail below. In some cases, the portfolio utilization calculator 208 may automatically add additional in-use periods to the beginning or end of a space determined based on power consumption data, for example such that the equipment is counted as in-use during set-up or cleaning phases in which little to no power is consumed by the equipment.

The portfolio utilization calculator 208 can then count the number of in-use sub-periods and divide that number by the total number of sub-periods. For example, an 8-hour business day includes 96 five-minute blocks. In such a case, the utilization score for one device may be calculated as the number of in-use blocks divided by 96. For a space that includes multiple devices of equipment, the equipment utilization metric can then be calculated as an average of the utilization scores for the equipment, e.g., $$U_{equipment} = \frac{1}{N} * \sum_{j=i}^{N} U_{equipment,j},$$

where the subscript j denotes different devices of equipment and N is the total number of monitored devices of equipment in the space.

The portfolio utilization calculator 208 of FIG. 3 (e.g., executed by the place controller 12 of FIG. 1) can thereby calculate combined utilization scores for each of a plurality of spaces in a laboratory, i.e., as indicated at block 210 of FIG. 3.

Figure 4:
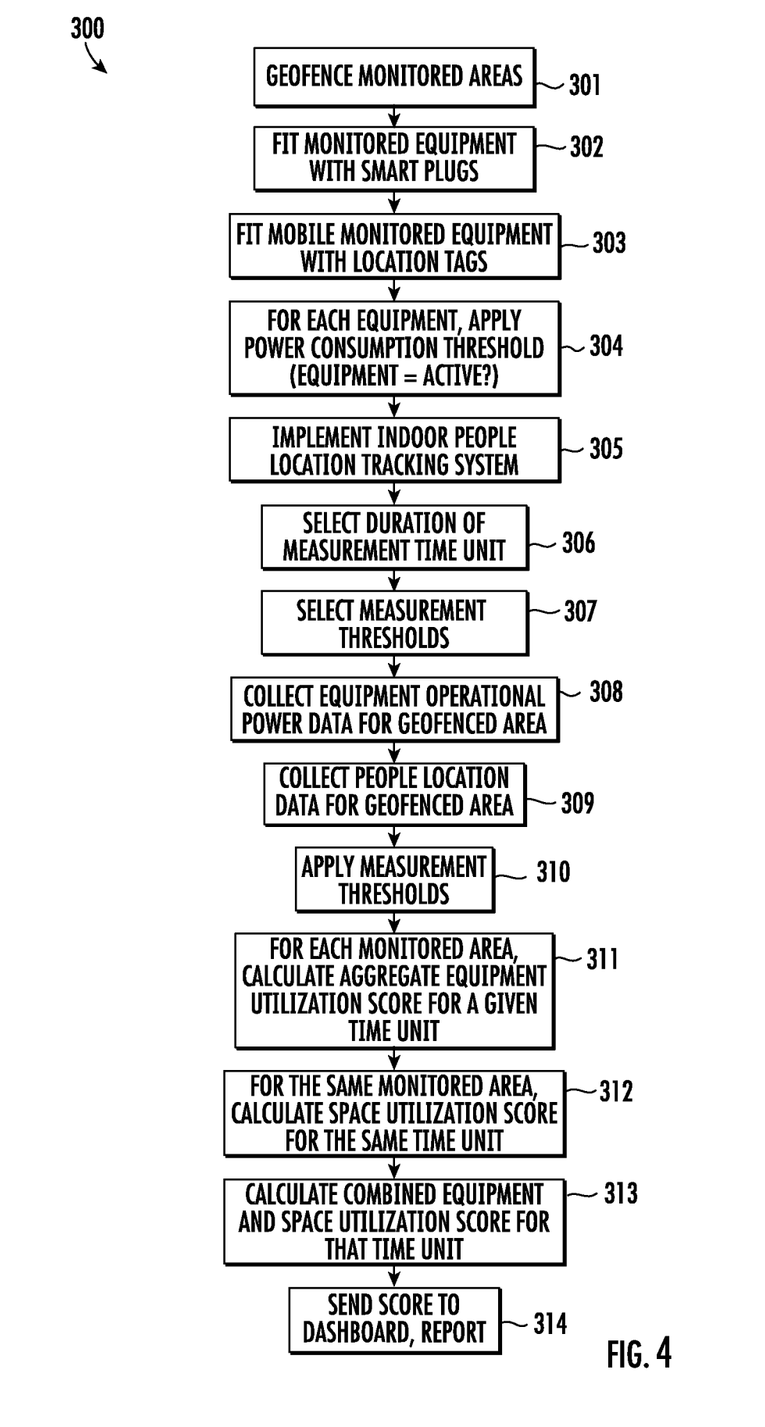
FIG. 4 is a flowchart of a process for monitoring utilization of a laboratory, according to an exemplary embodiment.

Referring now to FIG. 4, a flowchart of a process 300 for determining laboratory space utilization and providing a report on laboratory space utilization to a user is shown, according to an exemplary embodiment. The process 300 can be executed by the system 10 of FIG. 1.

At step 301, monitored areas (spaces) are geofenced. For example, the boundaries of the spaces may be virtually defined at the place controller 12 to denote the geographic limits of each space. In some cases, each space is differentiated by a wall or other physical structure. In other cases, two or more spaces may be open/continuous but defined as separate spaces using a geofencing approach at step 301. The utilization scoring described herein may tailored to provide a desired level of granularity based on the size and number of the spaces defined within a laboratory at step 301.

At step 302, equipment 14 is fit with smart plugs 16. For example, each device of equipment 14 may be associated with a particular smart plug 16 attached to a power cord of the device. Step 302 may include configuring the place controller 12 to map each smart plug 16 (and the data provided thereby) to a particular device of equipment and/or to a type of equipment.

At step 303, mobile/movable devices of equipment 14 (i.e., devices that are configured to be moved to various spaces of the laboratory over time) are fit with location tags (e.g., trackable beacons). Step 303 may include configured the place controller 12 to associate each location tag with the corresponding equipment 14, i.e., such that the place controller 12 can determine which equipment 14 is present in a space based on tracking data from a particular location tag.

At step 304, a power consumption threshold is defined for each device of equipment 14. For example, the place controller 12 may store a set of power consumption thresholds (e.g., values of amounts or rates of power consumption) for each type of equipment 14 or for each particular device of equipment 14. Step 304 may include mapping each device of equipment (and, in concert with step 302, each smart plug) with a power consumption threshold. The power consumption thresholds can be determined experimentally and/or input by a user.

At step 305, the occupant tracking system 18 is installed and configured. For example, the occupant tracking system 18 may be configured to coordinate with the geofenced borders defined at step 301, i.e., such that the occupant tracking system 18 is configured to provide data relating to which geofenced space an occupant is located in. In some embodiments, step 305 includes configuring the occupant tracking system 18 and/or the place controller 12 to associate each of multiple occupant beacons with a particular user and/or a type of user (e.g., based on role, job title, etc.).

At step 306, the duration of measurement time units is selected. For example, as described above, the equipment and occupancy utilization scores can be calculated based on a discretized set of sub-periods (measurement time unit), the length of which can be selected at step 306. Step 306 thereby allows tailoring of the temporal resolution of the utilization calculations described herein.

At step 307, measurement thresholds and parameters are set. The measurement thresholds and parameters may include minimum dwell times for an occupant to be counted as occupying a space. The measure thresholds and parameters may also include assumed (automatically added) equipment set-up, start-up, shut-down, or cleaning times. In some embodiments, the measurement thresholds and parameters include expected or maximum occupancy values, weighting factors, or other terms that customize the utilization calculations based on the type of space being evaluated.

At step 308, power consumption data for equipment in a space (e.g., within a geofenced boundary) is collected. For example, the power consumption data may be measured by the smart plugs 16 and transmitted to the place controller 12 via a wireless network. The power consumption data may be stored by the place controller 12 for later use in calculating utilization scores.

At step 309, occupancy data is collected for the geofenced space. For example, the occupant tracking system 18 may provide data relating to the positions of tracked personnel in the space (e.g., the determined locations of tracked beacons in the space). The occupancy data may include timing information describing when an occupant entered or left a space. The occupancy data may be stored by the place controller 12 for later use in calculating utilization scores.

At step 310, measurement thresholds are applied. For example, at step 310 the place controller 12 may remove occupancy data that indicates an occupant present in a space for less than the minimum dwell threshold. As another example, at step 310 the place controller 12 may determine the statuses of the equipment 14 over time by comparing the power consumption data to the power consumption threshold(s) for the equipment 14. Applying the measurement thresholds 310 may thereby result in a set of occupancy data that defines a number of occupants at a space for each of multiple sub-periods and a number of active devices of equipment for each of the multiple sub-periods.

At step 311, the equipment utilization score for a space is calculated for a time unit (i.e., a time period having multiple sub-periods). The equipment utilization score may be calculated as described above, for example by counting the number of sub-periods for which the equipment is active and dividing by the total number of sub-periods in the time unit (e.g., in one business day, in one week, etc.). For a space that includes multiple devices of equipment, the equipment utilization metric can then be calculated as an average of the utilization scores for the equipment, e.g., $$U_{equipment} = \frac{1}{N} * \sum_{j=i}^{N} U_{equipment,j},$$

where the subscript j denotes different devices of equipment and N is the total number of monitored devices of equipment in the space.

To illustrate step 311 in some embodiments, FIG. 5 shows an example table 500 illustrating the counting of the number of sub-periods for which the equipment is active as part of step 311. The table 500 shows five-minute blocks (sub-periods) in columns, denoted with the start and end times for each five-minute block (e.g., 9:00-9:05, 9:05-9:10, etc.). For each of the five-minute blocks and for each of three devices of equipment 14 (designated as EG 1, EG 2, and EG 3), the table 500 includes a cell which is selectively colored based on a status for the corresponding equipment for the corresponding five-minute block. For example, the row for EG 1 is filled in a first color for all five-minute blocks shown in table 500, indicating that equipment EG 1 was active for all sub-periods (i.e., indicating that power consumption of EG 1 exceeded a threshold for all sub-periods). The row for EG 2 is uncolored for all five-minute blocks shown in table 500, indicating that equipment EG 2 was inactive for all sub-periods shown. In some cases, a minimum activation threshold is used, for example such that EG 2 may be shown as inactive for a whole day (or other period) if active for less than the threshold (e.g., less than five minutes). The row for EG 3 is colored with the first color for a portion of the sub-periods, indicating that the equipment EG 3 was active for those sub-periods, and marked with a second color for a set of sub-periods on either side of the active sub-periods, indicating set-up and shut-down stages for the equipment EG 3. The number of shaded cells (i.e., those marked with the first or second color) can be counted and divided by a total number of cells to determine an equipment utilization score for the space. In the example of FIG. 5, equipment EG 1 was active for 96/96 sub-periods, equipment EG 2 was active for 0/96 sub-periods, and equipment EG 3 was active for 31/96 subperiods, resulting in a utilization score for the space of 97/288=0.44 (44%).

At step 312, the occupancy utilization score for the same space and the same time unit is calculated. The occupancy utilization score may be calculated as described above, for example based on a ratio of tracked occupants in the space over a sub-period to an expected or maximum occupancy for the space. For example, the occupancy utilization score can be calculated as $$U_{occupants} = \frac{1}{h} * \sum_{i=1}^{h} \frac{N_{detected,i}}{N_{expected,i}},$$

where h is the number of sub-periods in the time unit being assessed, $N_{detected,i}$ is the number of people who occupied the space for more than the minimum dwell threshold during sub-period i, and $N_{expected,i}$ is an expected or maximum occupancy for sub-period i. Other formulations are possible.

At step 313, a combined equipment and space (occupancy) utilization score is calculated for the time unit. For example, the combined utilization score may be calculated as a weighted average, e.g., $U_{combined}=\frac{1}{2}*(q*U_{equipment} r*U_{occupants})$, where q, r are scalar parameters (e.g., q+r=2). The weights may be selected (e.g., at step 307) based on an intended use or other characteristic of the space. In the formulation presented herein, the value of $U_{combined}$ is normalized to one, such that a percentage utilization can be found by multiplying 100%*$U_{combined}$.

Figure 7:
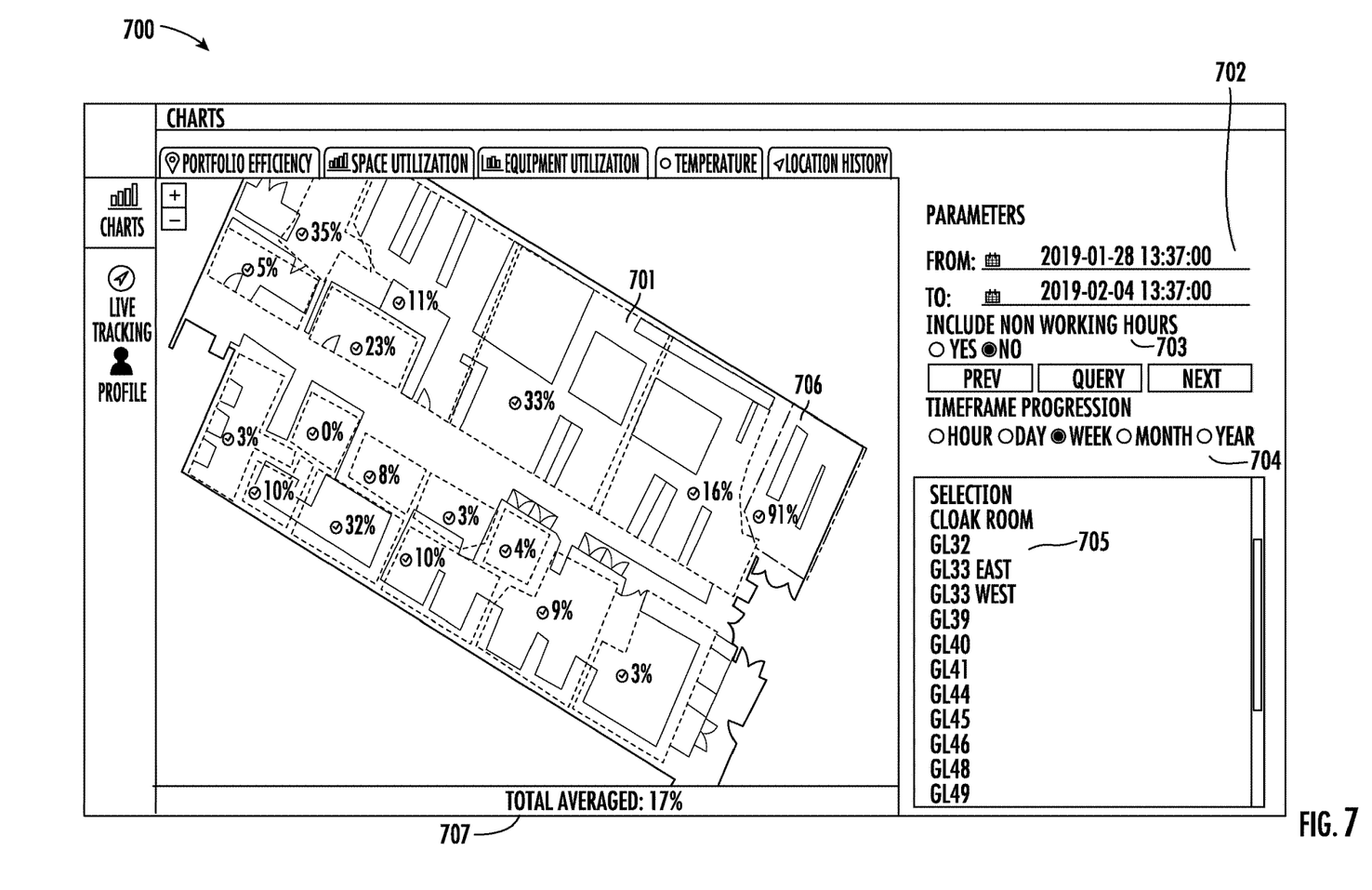
FIG. 7 is a view of a graphical user interface generated by the system of FIG. 1 and showing combined utilization scores for multiple monitored spaces of a laboratory facility, according to an exemplary embodiment.

At step 314, the utilization scores are sent to a dashboard (i.e., to a graphical user interface) that displays utilization results. Various displays are possible in various embodiments. For example, as shown in FIG. 7, a map of the laboratory may be displayed and overlaid with the geofenced boundaries and a combined utilization percentage for each space. In particular, FIG. 7 shows a dashboard 700 on which a map (floorplan) of the laboratory is shown. The boundaries of multiple spaces (e.g., first space 701, second space 706) are shown. For each space, a utilization indicator is overlaid on the space that shows the combined utilization score for the space. In the example shown, the first space 701 has a combined utilization score of 33% and the second space 706 has a combined utilization score of 91%. The spaces may be color-coded or otherwise differentiated based on the combined utilization score of each space. In the example shown, the second space 706 has a high combined utilization score (e.g., higher than a threshold value) and is outlined and shaded in a different color than other spaces of the dashboard 700 (e.g., as compared to space 701). The example of FIG. 7 thereby draws attention to spaces with combined utilization scores that may higher than a desirable level. Other utilization-based color codings (e.g., heat maps, etc.) may be used in various embodiments to highlight differences between spaces. Additionally, a total average combined utilization score for the laboratory is shown at bar 707 of the dashboard 700.

As shown in FIG. 7, the dashboard 700 also includes various options for customizing the data shown by the dashboard 700. As shown, the dashboard 700 includes a measurement period field 702 that allows a user to select the time period over which data is selected to generate the combined utilization scores shown on the dashboard 700, a non-working hours toggle 703 that allows a user to select whether non-working hours are included in the calculations, a timeframe progression option 704 that allows a user to select an hour, day, week, month, or year, and a space selection widget 705 that allows a user to select one or more spaces or places to be shown on the dashboard. The dashboard 700 thereby facilitates customization of the utilization scores shown on the dashboard 700. The place controller 12 may be configured to operate to update the calculations in response to user input to the dashboard 700.

Figure 6:
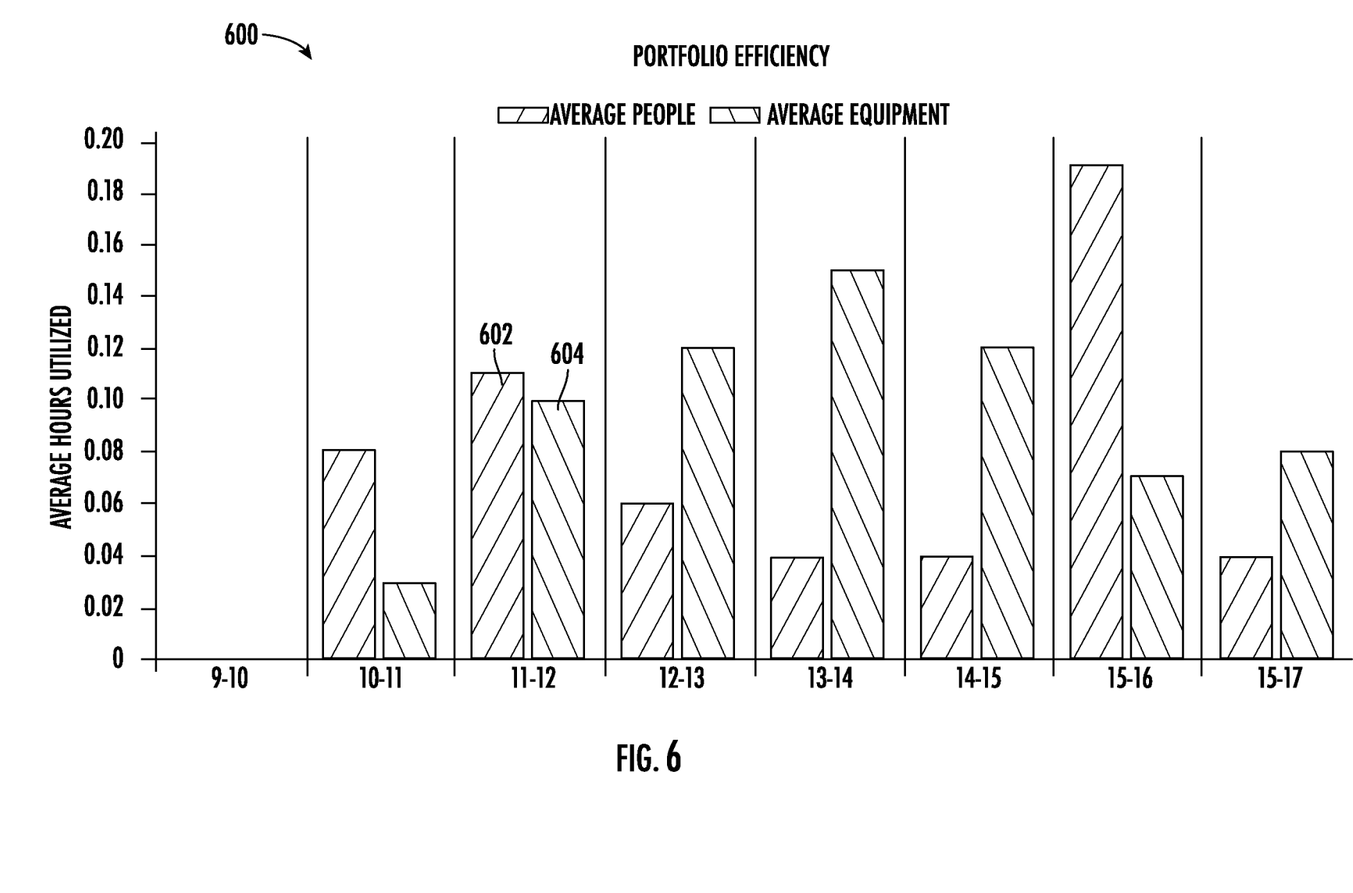
FIG. 6 is a bar graph showing results of laboratory utilization monitoring, according to an exemplary embodiment.

The utilization scores may also be displayed as a bar graph, for example as shown in FIG. 6. FIG. 6 shows a bar graph 600 that includes utilization scores for both occupancy utilization (e.g., bar 602) and equipment utilization (e.g., bar 604) for each of multiple time periods (shown as two-hour increments). The bar graph 600 thereby allows a user to compare occupancy utilization to equipment utilization over time (e.g., over the course of a business day).

In some embodiments, step 314 also includes automatically providing suggestions or recommendations based on the utilization results. For example, the place controller 12 may determine a first space with a high combined utilization score and a second space with a low utilization score and provide a recommendation that equipment or occupant activities be shifted from the first space to the second space. Various such recommendation logic may be pre-programmed and/or generated using machine-learning algorithms (e.g., neural network with supervised or unsupervised learning). For example, a machine-learning algorithm may be used to determine correlations between types of equipment and user interactions with that equipment, for example to determine when and how frequently users interact with a type of equipment, facilitating improvements to the operation of the research laboratory.

Process 300 thereby results in utilization scores being provided to a user, in a way that allows the user to directly compare the utilization of various spaces to facilitate modifications to space layout, rescheduling of experiments or personnel workhours, execution of maintenance or custodial tasks, and/or other improvements to the technological system (i.e., to the research laboratory). The systems and methods described herein thereby provided practical improvements to the technology of research laboratories.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A system for tracking laboratory equipment utilization of a laboratory, the system comprising one or more memory devices storing instructions thereon, the instructions, when executed by one or more processors, cause the one or more processors to:
receive energy consumption data of one or more pieces of laboratory equipment of the laboratory;
calculate an equipment utilization for a plurality of times of a window of time based on the energy consumption data;
generate a laboratory equipment utilization table comprising a plurality of rows and a plurality of columns;
wherein the plurality of columns represent the plurality of times, wherein one column of the plurality of columns represents one time of the plurality of times;
wherein intersections of the plurality of columns and the plurality of rows include an indicator indicating the equipment utilization for the plurality of times;
cause a display device of a user device to display a user interface including the laboratory equipment utilization table.

2. The system of claim 1, wherein one or more columns of the plurality of columns include time indications indicating the plurality of times.

3. The system of claim 1, wherein the indicator is one of a plurality of different indicators corresponding to different levels of the equipment utilization.

4. The system of claim 1, further comprising a plurality of network-connected plugs, the one or more pieces of laboratory equipment configured to draw electrical power from a building electrical system via the plurality of network-connected plugs;
wherein the plurality of network-connected plugs are configured to:
measure the energy consumption data by measuring the electrical power consumed by the one or more pieces of laboratory equipment; and
transmit the energy consumption data to the one or more processors.

5. The system of claim 1, further comprising:
a plurality of pieces of laboratory equipment, wherein the plurality of pieces of laboratory equipment are positioned in a plurality of spaces of the laboratory and are configured to consume electrical power when operating.

6. The system of claim 5, wherein the one or more processors cause the one or more processors to:
receive energy consumption data of the plurality of pieces of laboratory equipment of the laboratory;
generate a plurality of utilization scores for the plurality of pieces of laboratory equipment;
generate a floor plan layout representing the laboratory and the plurality of spaces of the laboratory, wherein the floor plan layout further includes the plurality of utilization scores for the plurality of pieces of laboratory equipment; and
cause the display device of the user device to display the floor plan layout.

7. The system of claim 1, further comprising:
a tracking system configured to detect locations of occupants of the laboratory;
wherein the instructions cause the one or more processors to:
define boundaries of a plurality of spaces of the laboratory;
calculate, for at least one of the plurality of spaces, an equipment utilization score based on data representing resource consumption of laboratory equipment positioned in the plurality of spaces over a time period;
calculate, for the at least one of the plurality of spaces, an occupancy utilization score based on data representing a number of people occupying the plurality of spaces over the time period; and
calculate, for the at least one of the plurality of spaces, a combined utilization score based on the equipment utilization score for the plurality of spaces and the occupancy utilization score for the plurality of spaces.

8. The system of claim 7, wherein calculating the combined utilization score comprises:
normalizing the equipment utilization score based on an expected equipment utilization; and
normalizing the occupancy utilization score based on an expected occupancy.

9. The system of claim 7, further comprising a plurality of trackable tags, each trackable tag associated with a device of the laboratory equipment;
wherein the instructions cause the one or more processors to automatically identify the laboratory equipment positioned at the plurality of spaces based on tracked positions of the plurality of trackable tags.

10. A method comprising:
receiving, by a processing circuit, energy consumption data of one or more pieces of laboratory equipment of a laboratory;
calculating, by the processing circuit, an equipment utilization for a plurality of times of a window of time based on the energy consumption data;
generating, by the processing circuit, a laboratory equipment utilization table comprising a plurality of rows and a plurality of columns;
wherein the plurality of columns represent the plurality of times, wherein one column of the plurality of columns represents one time of the plurality of times;
wherein intersections of the plurality of columns and the plurality of rows include an indicator indicating the equipment utilization for the plurality of times;
causing, by the processing circuit, a display device of a user device to display a user interface including the laboratory equipment utilization table.

11. The method of claim 10, wherein one or more columns of the plurality of columns include time indications indicating the plurality of times.

12. The method of claim 10, wherein the indicator is one of a plurality of different indicators corresponding to different levels of the equipment utilization.

13. The method of claim 10, further comprising:
measuring, via a plurality of network-connected plugs, the energy consumption data by measuring electrical power consumed by the one or more pieces of laboratory equipment; and
transmitting, via the plurality of network-connected plugs, the energy consumption data to the processing circuit.

14. The method of claim 13, further comprising:
receiving, by the processing circuit, energy consumption data of a plurality of pieces of laboratory equipment of the laboratory;
generating, by the processing circuit, a plurality of utilization scores for the plurality of pieces of laboratory equipment;
generating, by the processing circuit, a floor plan layout representing the laboratory and a plurality of spaces of the laboratory, wherein the floor plan layout further includes the plurality of utilization scores for the plurality of pieces of laboratory equipment; and
causing, by the processing circuit, the display device of the user device to display the floor plan layout.

15. The method of claim 10, further comprising:
defining, by the processing circuit, boundaries of a plurality of spaces of the laboratory;
calculating, by the processing circuit, for at least one of the plurality of spaces, an equipment utilization score based on data representing resource consumption of laboratory equipment positioned in the plurality of spaces over a time period;
calculating, by the processing circuit, for the at least one of the plurality of spaces, an occupancy utilization score based on data representing a number of people occupying the plurality of spaces over the time period; and
calculating, by the processing circuit, for the at least one of the plurality of spaces, a combined utilization score based on the equipment utilization score for the plurality of spaces and the occupancy utilization score for the plurality of spaces.

16. The method of claim 15, wherein calculating, by the processing circuit, the combined utilization score comprises:
normalizing the equipment utilization score based on an expected equipment utilization; and
normalizing the occupancy utilization score based on an expected occupancy.

17. One or more memory devices storing instructions thereon that, when executed by one or more processors, cause the one or more processors to:
receive energy consumption data of one or more pieces of laboratory equipment of the laboratory;
calculate an equipment utilization for a plurality of times of a window of time based on the energy consumption data;
generate a laboratory equipment utilization table comprising a plurality of rows and a plurality of columns, wherein intersections of the plurality of columns and the plurality of rows include an indicator indicating the laboratory equipment utilization for the plurality of times;
cause a display device of a user device to display a user interface including the laboratory equipment utilization table.

18. The one or more memory devices of claim 17, wherein one or more columns of the plurality of columns include time indications indicating the plurality of times.

19. The one or more memory devices of claim 17, wherein the indicator is one of a plurality of different indicators corresponding to different levels of the equipment utilization.

20. The one or more memory devices of claim 17, wherein the instructions cause the one or more processors to:
receive energy consumption data of the plurality of pieces of laboratory equipment of the laboratory;
generate a plurality of utilization scores for the plurality of pieces of laboratory equipment;
generate a floor plan layout representing the laboratory and the plurality of spaces of the laboratory, wherein the floor plan layout further includes the plurality of utilization scores for the plurality of pieces of laboratory equipment; and
cause the display device of the user device to display the floor plan layout.

* * * * *